(12) United States Patent
Cunningham (10) Patent No.: US 9,137,085 B2
(45) Date of Patent: Sep. 15, 2015

(54) ADJUSTING CONTROLS AT THE PHYSICAL LAYER TO CONTROL LINK QUALITY AT HIGHER LAYERS

(75) Inventor: Christopher Craig Cunningham, Belmont, MA (US)

(73) Assignee: BROADCOM CORPORATION, Irvine, CA (US)

( * ) Notice: Subject to any disclaimer, the term of this patent is extended or adjusted under 35 U.S.C. 154(b) by 293 days.

(21) Appl. No.: 13/808,180

(22) PCT Filed: Jul. 26, 2011

(86) PCT No.: PCT/US2011/045358
§ 371 (c)(1),
(2), (4) Date: Jan. 3, 2013

(87) PCT Pub. No.: WO2012/015817
PCT Pub. Date: Feb. 2, 2012

(65) Prior Publication Data
US 2013/0114625 A1 May 9, 2013

Related U.S. Application Data

(60) Provisional application No. 61/368,547, filed on Jul. 28, 2010.

(51) Int. Cl.
*H04L 29/06* (2006.01)
*H04L 12/26* (2006.01)
(Continued)

(52) U.S. Cl.
CPC ...... *H04L 29/06006* (2013.01); *H04L 12/2602* (2013.01); *H04L 41/5009* (2013.01); *H04L 43/00* (2013.01); *H04L 43/04* (2013.01); *H04L 69/02* (2013.01); *H04L 69/32* (2013.01)

(58) Field of Classification Search
CPC .................. H04L 29/06006; H04L 41/5009
See application file for complete search history.

(56) References Cited

U.S. PATENT DOCUMENTS 6,975,597 B1   12/2005   Baker et al.
7,580,471 B2   8/2009    Cunningham
(Continued)

FOREIGN PATENT DOCUMENTS

WO    99/50967    10/1999
WO    02/27564    4/2002

OTHER PUBLICATIONS

International Preliminary Report on Patentability in related international application No. PCT/US2011/045358, mailed on Feb. 7, 2013; 6 pages.

(Continued)

*Primary Examiner* — Man Phan
*Assistant Examiner* — Kevin Lee
(74) *Attorney, Agent, or Firm* — Oblon, McClelland, Maier & Neustadt, L.L.P.

(57) ABSTRACT

A system and method for controlling a performance of a communication link in a data communication system comprises mapping performance of a communication link, as characterized by metrics computed at a first protocol layer in a network device, to quality of the communication link as characterized by metrics computed at a second protocol layer in the network device. The second protocol layer is higher than the first protocol layer in a protocol stack running on the network device. A setting of one or more communication link controls at the first protocol layer is adjusted to attain a given communication link performance at the first protocol layer that, according to the mapping between the communication link performance at the first protocol layer and the quality of the communication link at the second protocol layer, corresponds to a target quality of the communication link at a second protocol layer.

31 Claims, 5 Drawing Sheets

(51) Int. Cl.
*H04L 12/24* (2006.01)
*H04L 29/08* (2006.01)

(56) References Cited

U.S. PATENT DOCUMENTS

2006/0098725 A1    5/2006    Rhee et al.
2008/0292021 A1    11/2008   Lv et al.
2009/0316730 A1    12/2009   Feng et al.
2010/0183062 A1    7/2010    Everett et al.
2011/0019575 A1    1/2011    Croot et al.

OTHER PUBLICATIONS

International Search Report and Written Opinion for counterpart international patent application No. PCT/US2011/45358, mailed on Feb. 17, 2012, Kipo; 14 pages.

ADJUSTING CONTROLS AT THE PHYSICAL LAYER TO CONTROL LINK QUALITY AT HIGHER LAYERS

RELATED APPLICATIONS

This application is a 371 application of International Application No. PCT/US2011/045358, filed Jul. 26, 2011, titled "Adjusting Controls at the Physical Layer to Control Link Quality at Higher Layers," which claims the benefit of and priority to U.S. Provisional Application Ser. 61/368,547, filed Jul. 28, 2010, titled "Improving Perceived Quality of Delivered Content Through the Adjustment of Controls at the Physical Layer and Optionally One or More Higher Layers in a Communication System," the entireties of which provisional and international applications are incorporated by reference herein.

FIELD OF THE INVENTION

The invention relates generally to data communications. More specifically, the invention relates to line management of communication links.

BACKGROUND

Modern communication systems are typically partitioned into layers. An example of such a partitioning is the seven-layer Open Systems Interconnection model (OSI model), devised by the International Organization for Standardization. The OSI model categorizes the portion of the communications system that is closest to the physical medium as the physical layer (PHY), which is often referred to as the lowest of the seven layers. Therefore, the other six layers in the OSI model can be referred to as higher layers relative to the PHY. These abstract layers above the PHY perform various functions, for example, authentication, bridging, routing, and application services. When a network device sends a communication to another network device, the communication passes down through the layers of the protocol stack of the sending device and up through layers of the protocol stack of the receiving device. Each given layer communicates with either the next layer above or the next layer below that given layer. The protocol at each given layer corresponds to that set of rules followed in order provide the services of that given layer.

In practice, implementations of communication systems do not always precisely partition into those layers specified by models such as the OSI model. In addition, the dividing line between the PHY and the higher layers may differ from implementation to implementation and, for some implementations, may be blurry, where operations may be grouped either with the PHY or with the higher layers. Nonetheless, irrespective of where the dividing line lies, the layers can be partitioned into at least two segments: the PHY and the higher layers.

Data problems can be detected at any one or more of the layers. For example, faults in the physical media can corrupt data units. If a data unit is erred, the protocol layer processing the data unit may discard the data unit or transfer the data unit to the next layer in the protocol stack, in effect propagating the error to a higher layer. Eventually, if correction of the data unit does not occur, either by retransmission or by a form of error correction, the corrupt data can degrade the quality of the application layer. For example, a television receiving video information over a data network may experience a display anomaly as a result of the erred data.

Controls are typically applied at each of the layers to minimize errors and optimize the performance of the layer for a given communication link. However, the precise effect of the controls applied at the PHY upon the quality of the communication link at the higher layers is, for the most part, unknown. In practice, adjusting the PHY without regard to the higher layer may be of little or no consequence to higher-layer link quality.

SUMMARY

In one aspect, the invention features a method for controlling a performance of a communication link in a communication system. The method comprises mapping performance of a communication link, as characterized by metrics reported by a first protocol layer in a network device, to quality of the communication link, as characterized by metrics reported by a second protocol layer in the network device. The second protocol layer is higher than the first protocol layer in a protocol stack running on the network device. A setting of one or more communication link controls at the first protocol layer is adjusted to attain a given communication link performance at the first protocol layer that, according to the mapping between the communication link performance at the first protocol layer and the quality of the communication link at the second protocol layer, corresponds to a target quality of the communication link at a second protocol layer.

In another aspect, the invention features a computer program product for controlling a performance of a communication link in a communication system. The computer program product comprises a computer readable persistent storage medium having computer readable program code embodied therewith. The computer readable program code comprises computer readable program code that, if executed, maps performance of a communication link, as characterized by metrics reported by a first protocol layer in a network device, to quality of the communication link, as characterized by metrics reported by a second protocol layer in the network device. The second protocol layer is higher than the first protocol layer in a protocol stack running on the network device. The computer readable program code further comprises computer readable program code that, if executed, adjusts a setting of one or more communication link controls at the first protocol layer to attain a given communication link performance at the first protocol layer that, according to the mapping between the communication link performance at the first protocol layer and the quality of the communication link at the second protocol layer, corresponds to a target quality of the communication link at a second protocol layer.

In still another aspect, the invention features a communication, comprising memory storing computer readable program code, and a processor capable of running the computer readable program code stored in the memory. The computer readable program code, if executed, mapping performance of a communication link, as characterized by metrics reported by a first protocol layer in a network device, to quality of the communication link, as characterized by metrics reported by a second protocol layer in the network device, the second protocol layer being higher than the first protocol layer in a protocol stack running on the network device, and adjusting a setting of one or more communication link controls at the first protocol layer to attain a given communication link performance at the first protocol layer that, according to the mapping between the communication link performance at the first protocol layer and the quality of the communication link at the second protocol layer, corresponds to a target quality of the communication link at a second protocol layer.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Dynamic line management (DLM) is a general term often applied to digital subscriber line (DSL) communication links, but may be applied more generally to any communication link. As used herein, the term "dynamic line management" preferably refers to methods, processes, or techniques of adaptively changing communication link controls to maintain or improve performance while the target communication link is in operation, possibly with short disruptions when reconfiguring controls. The more general term "line management" preferably refers to methods, processes, or techniques of setting communication link controls in order to control performance irrespective of when this setting occurs, whether before or during operation of the target communication link.

Communication link controls include adjustable settings that control various aspects of the communication link. Examples of communication link controls available to the PHY include, but are not limited to, minimum and maximum data rates, target signal-to-noise ratio (SNR) margin, latency constraints, channel coding techniques, such as FEC (Forward Error Correction), transmit power, and spectral shaping. Examples of communication link controls available to higher layers include, but are not limited to, buffer sizes and controls for interpolating missing data.

Communication link performance may be measured relative to some combination of objectives for different facets of the communication link. Performance facets that are directly measurable by the PHY include, but are not limited to, payload data rate, stability in the presence of changing line conditions (e.g., distribution of CRCs (cyclic redundancy checks) over time), PHY latency, and the transmit power distribution that can affect neighboring lines. The PHY usually reports metrics related these performance facets. Other performance facets are not generally directly reported by the PHY, such as the existence of physical impairments (e.g., bridged taps or metallic faults), so they are derived from other data and formulated into metrics (e.g., the cost required to remedy the physical impairment). These metrics can be used to determine when the communication link has experienced a disruption, whether the communications link can better be optimized to increase the capacity of a collection of lines, or whether it is important for resources to be applied to physical remediation. (Herein, the term disruption refers to errors, delay, decrease in throughput, and/or loss of data. For example, CRC calculations performed within the PHY often provide an indication that an error has occurred within some unit of data. In addition, FEC, such as Reed-Solomon codes, can provide error metrics.) The PHY also reports latency attributable to the physical layer and its payload data rate, which is the amount of information that is being carried by the PHY exclusive of overhead and coding redundancy.

Higher layers can also directly measure performance facets and report metrics related to these facets from which can be determined the quality of the communication link at the higher layers (referred to as the "higher-layer link quality"). Such performance facets include, but are not limited to, video quality metrics and end-to-end latency. For example, video quality metrics have been devised to provide an indication of user experience for video links.

Systems described herein implement dynamic line management and line management mechanisms to maintain or improve the higher-layer link quality using PHY controls. Such mechanisms can also use higher-layer controls in combination with PHY controls to improve or maintain the higher-layer link quality. The mechanisms use a pre-calibrated relationship or mapping between disruptions at the PHY and their consequent higher-layer link quality. For a given disruption anticipated or actually detected on the target communication link, the systems can refer to this mapping to determine and apply the appropriate type and degree of control settings at the PHY and/or at the higher layers, which will achieve a known desired effect on the higher-layer link quality in accordance with the mapping.

In addition to improving the quality of a communication link, other uses for these mechanisms include minimizing or optimizing the transmit power of the PHY in order to maximize the mutual capacity of neighboring collection of lines. For example, if it is determined that the higher-layer metrics are insensitive to impulsive noise affecting the PHY, then the PHY can reduce resources allocated to impulse noise protection (INP), thus allowing the PHY to transmit fewer redundancy bits. Having fewer redundancy bits to transmit allows the PHY to decrease the transmit power applied to the line. The decreased transmit power can reduce crosstalk that affects neighboring lines, and the reduced crosstalk can increase the overall capacity of the collection of lines. Another use is to minimize service costs (e.g., truck rolls) by determining when expenditures to improve the PHY layer are not warranted because such improvements will not significantly affect the higher layers. For example, if it is determined that the higher-layer metrics are insensitive to the data rate reduction being caused by a bridged tap detected on the line, then the cost of a "truck roll" can be avoided.

Figure 1:
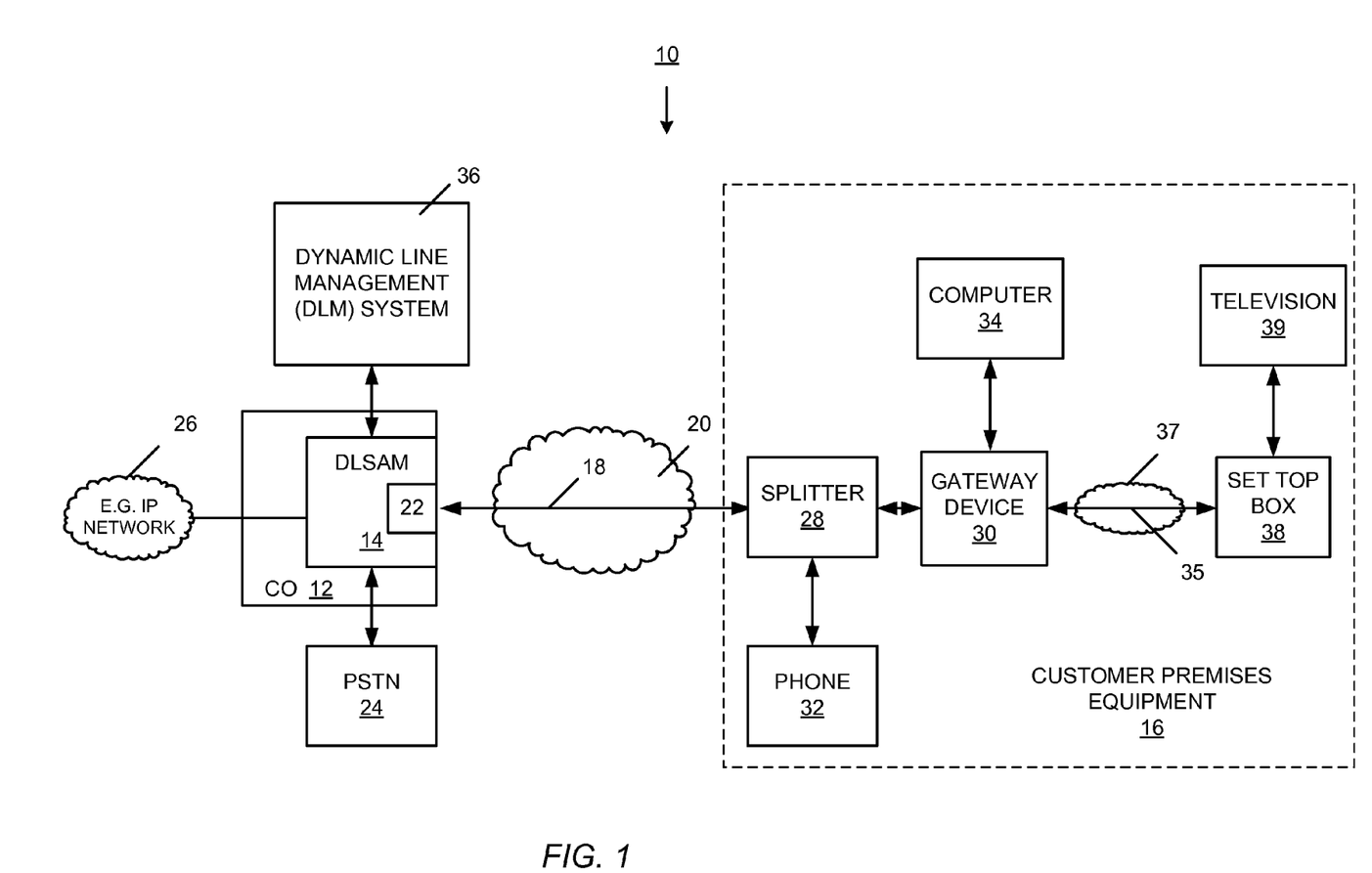
FIG. 1 is a diagram of an embodiment of a communication system including a central office in communication with customer premises equipment.

FIG. 1 shows an embodiment of an oversimplified communication system 10 including a first network device 12 in communication with a second network device 16 by a communication link 18 over a network 20. The system 10 is being presented here as a DSL system for purposes of illustrating the principles described by way of example. In general, these principles can be embodied in any system having a device that receives data units over a communication link, wherein that device has a PHY and at least one higher protocol layer, and the system has mechanisms for controlling data unit processing at those layers and for collecting performance metrics from those layers.

In this example, the communication link 18 is part of an access network 20 connecting directly to the end user (or, specifically, customer premises equipment), and is preferably a digital subscriber line used for video, audio, and streaming content to be observed by an end user in real time. For these types of communication links, the user experience is susceptible to significant adverse impacts by disruptions in the communication link. Accordingly, the principles described herein may be particularly useful for this type of communication link. Notwithstanding, the communication link 18 can be of any type without departing from the principles described herein.

In one embodiment, the first network device 12 is represented by a central office or local exchange (hereafter, CO 12) with a DSLAM (DSL Access Multiplexer) 14. The DSLAM 14 includes an xDSL modem (e.g., ADSL 2+, VDSL) 22. The DSLAM 14 separates normal voice traffic from data traffic, directing voice traffic to and from the PSTN (Public Switched Telephone Network) 24 and data traffic to and from a data network 26 (e.g., an IP (Internet Protocol) network).

In general, the second network device 16 can be any type of home networking device including, but are not limited to, modems (DSL and cable), Wi-Fi devices, coaxial cable devices (HPNA, MoCA, G.hn, etc.), powerline devices, bridge routers, set-top boxes, and mobile handsets. In one embodiment, the second network device 16 is illustrated generally by customer premises equipment (hereafter, CPE 16). In this embodiment, the CPE 16 includes a splitter 28, a gateway device 30, a telephone 32, a computer 34 in communication with the gateway device 30, a set top box 38 in communication with the gateway device 30 by a communication link 35 over a network 37, and a television 39. The splitter 28 separates voice traffic from DSL signals, directing voice traffic to and from the telephone 32 and DSL signals to and from the gateway device 30. The gateway device 30 is adapted to communicate with the DSLAM modem 22 to receive and transmit a DSL signal. The set top box 38 is in communication with the television 39 for presenting video and audio content to the end user, such as is common in IPTV (Internet Protocol Television) applications.

Either or both the gateway device 30 and set top box 38 run a protocol stack (not shown), divided into two partitions, for processing communications: the first partition referred to as the PHY contains the physical layer, and the second partition, referred to as the higher layers, contains the remaining protocol layers above the PHY in the protocol stack. The higher layers typically include an application layer at or near the highest layer of the protocol stack. PHY and higher-layer controls applied at the gateway device 30 are used to affect communications over the communication link 18. The PHY controls and higher-layer controls applied at the set-top box 38 affect communications over the communication link 35. The principles described herein extend to either or both PHYs associated with communication link 18 over the network 20 and communication link 35 over the network 37.

The DSL system 10 also includes a dynamic line management (DLM) system 36. In brief overview, the DLM system 36 automatically assesses the performance of the communication link 18 and/or communication link 35, finding line faults, and adapting DSLAM service profiles to mitigate disruptions that can affect customer service. The DLM system 36 can make adjustments dynamically to the performance of the DSLAM 14 by applying controls at the PHY and/or higher layers of the gateway device 30. In addition, the DLM system 36 can refer to stored mappings that correlate disruptions at the PHY with their effects on quality measured at the higher layer, to select the appropriate controls to be applied, such selected controls being particularly tuned in accordance with the mapping.

The DLM system 36 can be embodied in a variety of types of equipment, including, but not limited to, modems (DSL and cable), test equipment, servers, remote gateway, bridge routers, set-top boxes, satellite receivers, mobile handsets, and networked appliances. The DLM system 36 can reside on a remote network (e.g., network 26), within the CO 12, or within the CPE 16. Aspects of the DLM system 36 may be distributed across multiple devices, whether collocated or separate from each other. For purposes of simplifying the illustration, the DLM system 36 is shown in direct communication with the DSLAM 14 of the CO 12, although it is to be understood such communication is usually indirect, passing through various network devices. In addition, in some embodiments, the DLM system may be connected directly to the communication link 18, to the communication link 35, or to the CPE 16.

Figure 2:
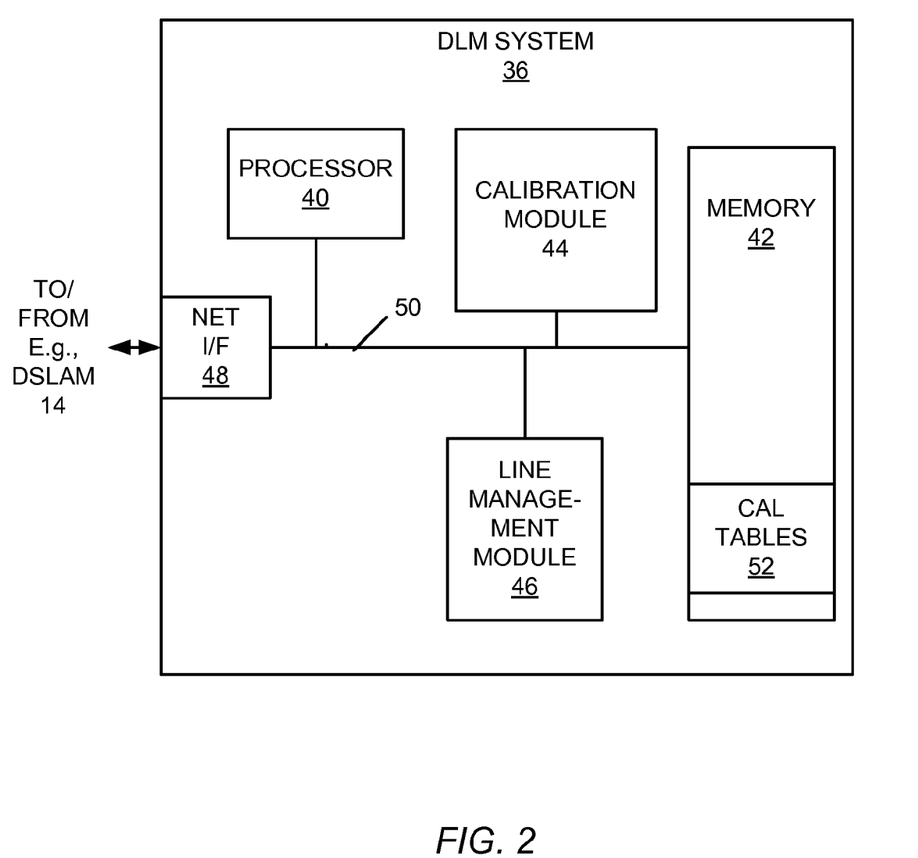
FIG. 2 is a functional block diagram of an embodiment of a dynamic line management system.

FIG. 2 shows a functional block diagram of an embodiment of the DLM system 36 including a processor 40, memory 42, a calibration module 44, a line management module 46, and a network interface (I/F) 48, each connected to a communication bus 50. The memory 42 can include non-volatile (i.e., persistent) computer storage media, such as read-only memory (ROM), and volatile computer storage media, such as random-access memory (RAM). Stored within the RAM are program code and data. Program code includes, but is not limited to, application programs, program modules including aspects of the calibration module 44 and the line management module 46, and an operating system. In brief overview, the calibration module 44 determines calibration relationships (mappings) between distortions that may affect the PHY layer and the effects of such distortions on higher-layer link quality. The calibration relationships can be stored in the memory 42, for example, as calibration tables 52, described further in connection with FIG. 4 and FIG. 5. The line management module 46 dynamically assesses and adjusts the performance of the communication link 18 and/or communication link 35 based on changing line conditions and/or metrics obtained from the CPE 16, as described in more detail in connection with FIG. 6. The network interface 48 processes communications to and from the DLM system 36.

The communication bus 50 is the means by which data and controls (commands) move to and from the components and modules connected to the bus, and by which the processor 40 coordinates operations among such components and modules. The communication bus 50 can be implemented using any proprietary or conventional bus architecture and protocols, examples of which include, but are not limited to a Peripheral Component Interconnect (PCI) bus, an Industry Standard Architecture (ISA) bus, and an Enhanced Industry Standard Architecture (EISA) bus. Although shown as a single bus, the communication bus can comprise multiple busses, for example, a memory bus and a control bus.

Figure 3:
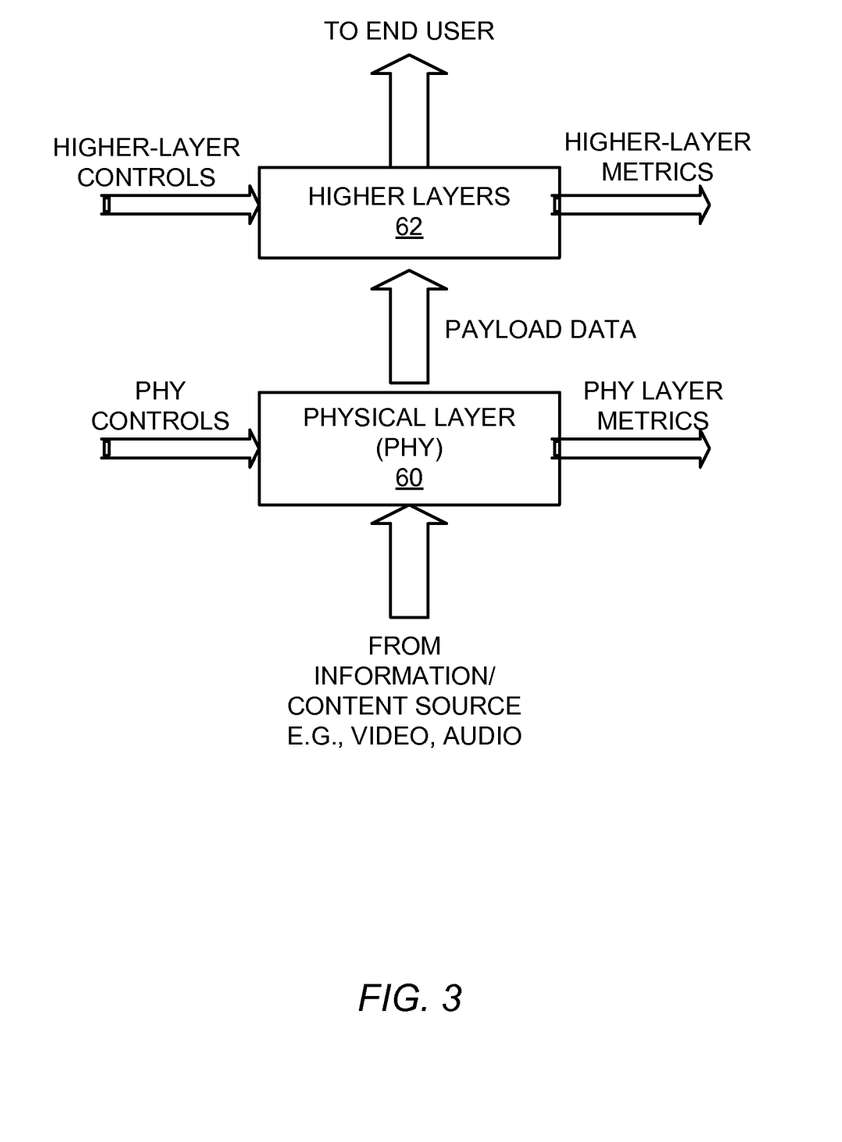
FIG. 3 is a functional block diagram of an embodiment of a process for processing data units at customer premises equipment.

FIG. 3 pictorially illustrates an embodiment of a method of processing data units (e.g., protocol data units, blocks, cells, packets). In the description of the process reference is made to the features described in FIG. 1. The physical layer or PHY 60 running on the CPE 16 (e.g., the gateway device 30, the set-top box 38) receives the data units over the communication link 18. The data units originate from an information source (e.g., on the IP network 26) and have content (e.g., video, audio) to be presented to the end user. For processing the received data units, the PHY applies PHY controls. The CPE can be preset with the PHY controls (more specifically, settings for the controls), acquire the PHY controls from the DSLAM 14 initially, upon establishment of the communication link, or dynamically, while the communication link is in operation, or any combination thereof. Such PHY controls include, but are not limited to, minimum and maximum data rates, target SNR margin, and maximum latency. Various PHY metrics are reported during the data unit processing, examples of which include, but are not limited to, PHY latency, CRC errors, and payload data rate. The PHY metrics can be sent to the DLM system 36, for example, by way of the DSLAM 14 over the communication link 18 or by way of another communication path (e.g., an Ethernet connection).

The payload data passes "up" the protocol stack from the PHY 60 to the higher layers 62. At the higher layers, various higher-layer controls are applied during the processing of the payload data. Such higher-layer controls include, but are not limited to, buffering. The settings for the controls can be preset, acquired initially or dynamically from the DSLAM, or any combination thereof. In the processing of the payload data, the higher-layers compute various higher-layer metrics including, but not limited to, a video quality metric and end-to-end latency. As done similarly with the PHY metrics, the CPE can report the higher-layer metrics to the DLM system 36.

Figure 4:
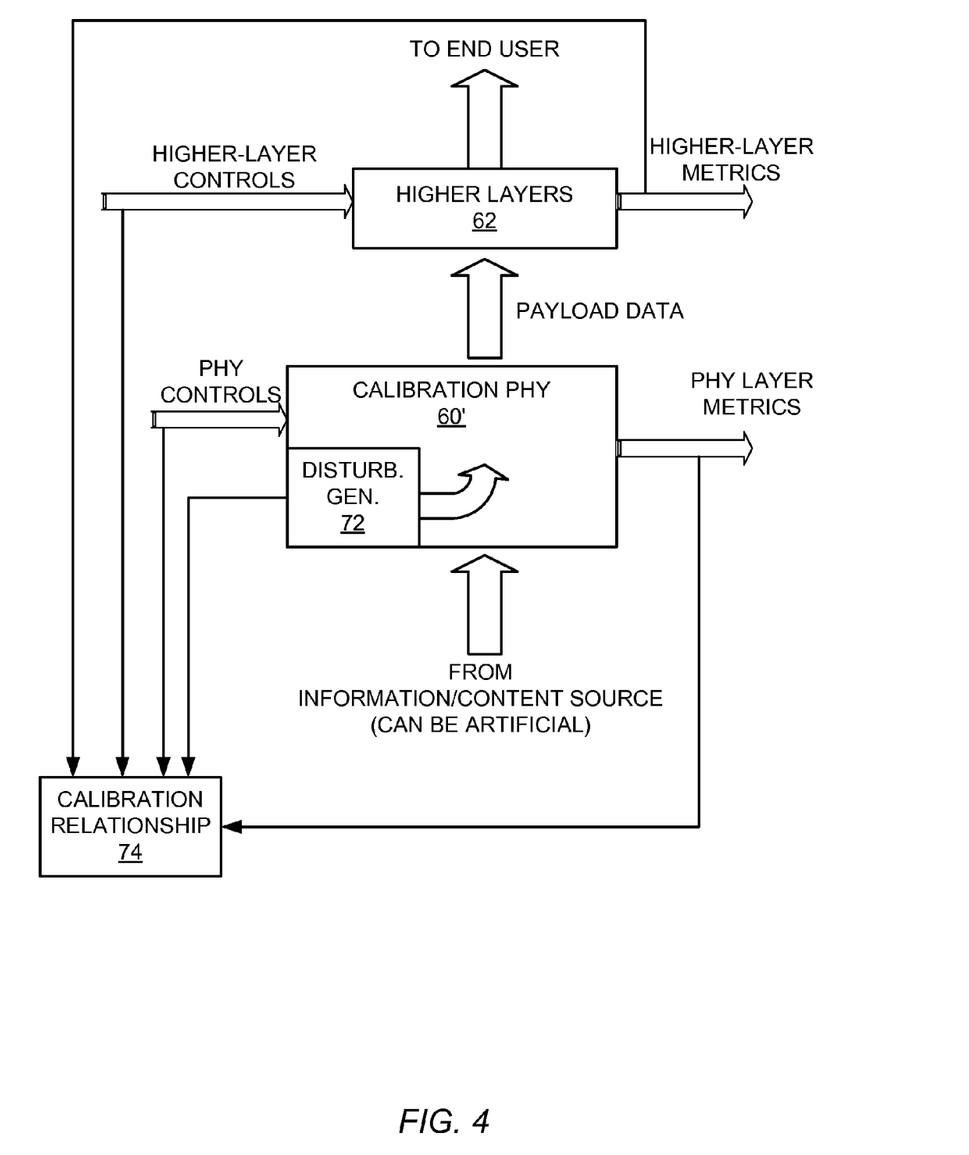
FIG. 4 is a functional block diagram of an embodiment of a calibration process.

FIG. 4 pictorially illustrates a calibration process 70 for generating the calibration relationships that can be used in line management and dynamic line management processes. An objective of the calibration process is to quantify and "learn" calibration relationships 72 (or mappings) between PHY disruptions (e.g., errors and payload data rates) and higher-layer measures of communication link quality for given types of CPE. The calibration process typically runs before the end user establishes a target communication link, such as, for example, in a testing lab using a representative sample of the CPE, although, in some embodiments, the calibration process can be run after the end user establishes a communication link (i.e., in the field) in order to update or augment previously determined calibration relationships. In the description of the calibration process 70, reference is also made to FIG. 5.

Figure 5:
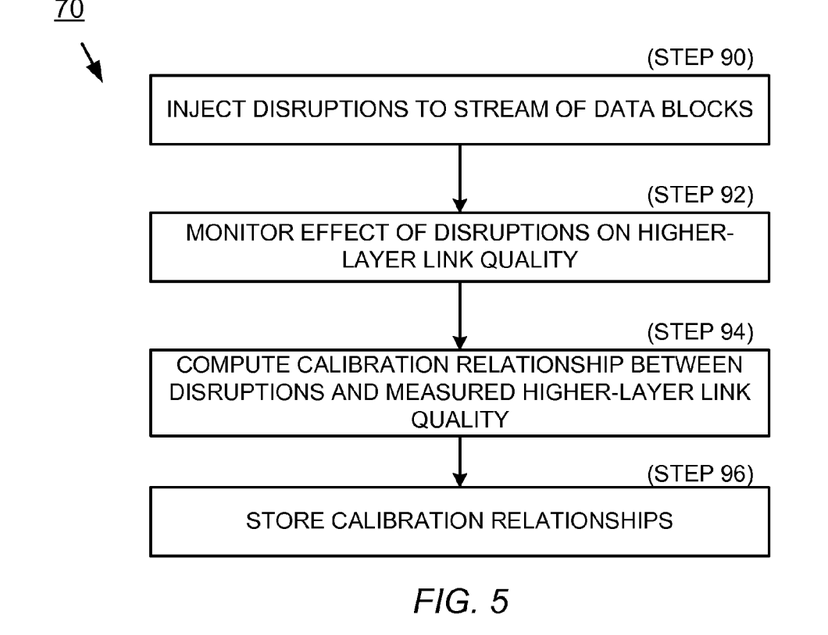
FIG. 5 is a flow diagram of the calibration process of FIG. 4.

In addition to those facets described in connection with FIG. 3, the calibration process involves the use of a disturbance generator 74 (here, embodied within the PHY 60 running on the CPE; the combination being referred to as a calibration PHY 60'). For purposes of the calibration process, the data units processed by the calibration PHY 60' can originate from an artificial information source. The disturbance generator 74 deliberately introduces (step 90) known disruptions into the PHY processing of the data units. The disruptions can be, for example, errors, data loss, reduced throughput, increased latency. The calibration PHY 60' can be an actual (i.e., true) PHY that receives the disruptions from the disturbance generator or an emulated PHY includes the disturbance generator and generates the disruptions itself. The disrupted data units are passed up to the higher layers 62. While processing the disrupted data units, the higher layers 62 compute higher-layer metrics. These higher-layer metrics are monitored (step 92), the effect of the disruptions being reflected in the measurements obtained. For example, while the disturbance generator 74 incrementally reduces PHY throughput for the data units, the CPE 16 can monitor the effect on video quality by analyzing consequent video quality metrics (i.e., an example of a higher-layer metric). From this analysis of the higher-layer metrics, acceptable levels of PHY errors and throughput are determined, thereby permitting fine-tuning of the PHY in order to achieve acceptable higher-layer link quality. Similar calibration measurement techniques may be performed for different severity and frequency distributions for various types of disruptions.

The effect of PHY errors and throughput on communication link quality depends on the higher-layer implementation, namely, the particular application (e.g., video, voice, etc.) running at the application layer of the CPE 16, and, potentially, end user personal preference settings. For example, more buffering and sophisticated interpolation/resolution adjustments in the set-top box 38 can accommodate higher PHY error rates and lower PHY throughput. For such CPE, incremental changes in disruptions at the PHY during the calibration process may not immediately manifest as reduced quality at the higher layers until the disruptions exceed a particular level where the device can no longer accommodate the error rate or throughput.

From the collective calibration data, comprised of higher-layer control settings applied, PHY control settings, PHY metrics, intentionally injected disruptions, and resulting higher-layer metrics, the calibration relationships are computed (step 94). Numerous existing regression and multi-dimensional "curve fitting" techniques can be used to build a model of the calibration relationships from this collective information.

Calibration relationships can be quantified for different line conditions, different types of noise, different communication link contents (e.g., fast sports, etc.), different higher-layer control settings, and for different personal preferences (e.g., users may differ on their level of tolerance for slow frame rate, or reduced resolution, or tiling, etc.). By introducing disruptions similar to those that might be experienced during normal operation of the target communication link (e.g., links 18 and 35), it is possible to construct and store in memory (and, thus, make available to the DLM system) calibration relationships between those PHY disruptions most likely to occur (if any were to occur) and their effect on higher-layer link quality metrics. In addition, calibration relationships may be interpolated and extrapolated to predict conditions that were not directly measured during the calibration process. The calibration relationships may be recorded in memory 42 at the DLM system 36, for example, as lookup tables, compressed, and/or parameterized.

Figure 6:
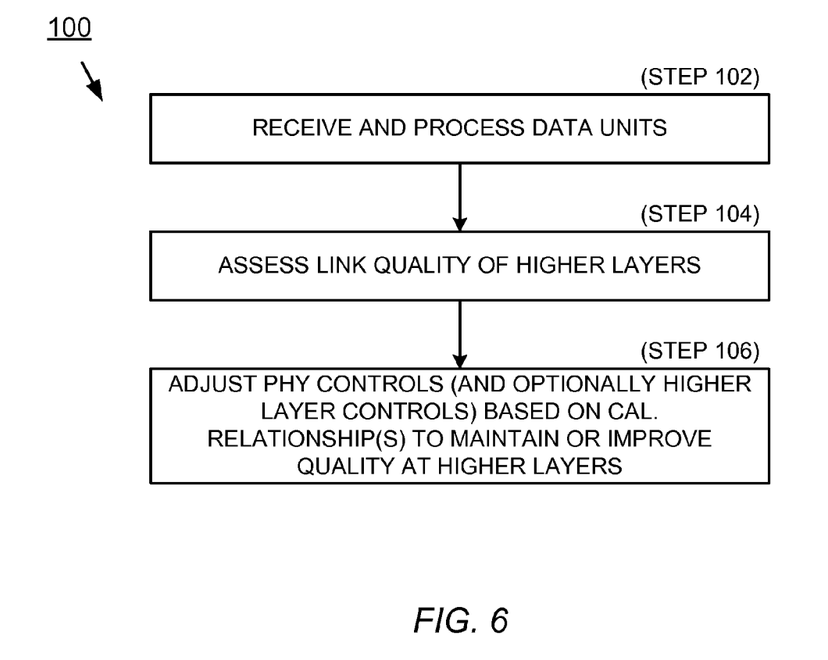
FIG. 6 is a flow diagram of an embodiment of a process for dynamic line management using calibration relationships between PHY performance and higher-layer link quality.

FIG. 6 shows an embodiment of a process 100 for dynamically adjusting the quality of a communication link as measured at a higher layer. At step 102, the CPE 16 receives and processes data units in accordance with current PHY and higher-layer controls, and in response produces PHY and higher-layer metrics. These PHY and higher-layer metrics pass to the DLM system 36. The DLM system 36 determines from the received metrics that the higher-layer link quality can be improved upon. For example, using only the PHY metrics (e.g., CRC, FEC, SNR margin, payload data rate, latency), the DLM system 36 can access the stored calibration relationship model stored in a lookup table 52 and quantify (step 104) the quality of the communication link at the higher layers. For example, according to the calibration relationship, the FEC measured at the PHY 60 may correlate to marginally satisfactory video quality metrics at the higher layers 62. The DLM system 36 can draw this conclusion from the FEC PHY metric and the calibration relationship, without having to refer to any higher-layer metric, although reference to a higher-layer metric can confirm or increase confidence in the conclusion. Or, for example, the DLM system 36 can detect a condition (e.g., noise) on the communication link 18 and/or 35 that has a known quantifiable effect on PHY errors. Again using the calibration relationship, the DLM system 36 can use the appropriate PHY metric (associated with these particular PHY errors) to acquire a corresponding higher-layer metric and determine therefrom the effect of that noise on the higher-layer link quality.

In response to a detected line condition or received metric, the DLM system 36 can take measures to improve the higher-layer link quality by adjusting (step 106) the PHY controls (e.g., min/max data rates, target SNR margin, and/or latency constraints). The DLM system 36 can adjust the PHY controls for example, by changing the selection of a new DSLAM profile for communicating with the CPE.

In one embodiment, the PHY metrics only of the target communication link are supplied as inputs to compute the PHY controls, using the calibration relationships associated with those PHY metrics to update the PHY control setting that will result in new PHY metrics that correlate with improved higher-layer link quality. In another embodiment, referred to as a global adjustment of the communications link, the DLM system 36 uses all available controls jointly; specifically, the PHY metrics and the higher-layer metrics (video quality metrics, end-to-end latency, etc.) of the target communication link are used to compute the PHY controls (min/max data rates, target SNR margin, latency constraints, etc.) and/or higher-layer controls (buffer sizes, missing data interpolation controls, etc.). Setting the PHY controls, higher-layer link controls, or a combination thereof, can take place when the target communication link is initially established or be dynamically updated during the lifetime of the target communication link using a DLM technique. DLM can also employ iterative feedback (trial and error), direct calculation of the fine-tuned settings, or a combination thereof. Many conventional optimization techniques can be used to derive the appropriate PHY controls (for the PHY indicators only embodiment) or the combination of PHY and higher-layer controls (for the global adjustment embodiment).

The generation of calibration relationships makes possible the calculation of various new indicators. For example, one such indicator that is particularly useful for diagnostics purposes, referred to as a link quality reduction indicator, can be used to quantify the effect of various physical impairments on the quality of the communication link. For example, a particular noise source may be detected on the line, and it may be known that an increased error rate (e.g., more frequent CRC errors at the PHY) is associated with this noise source. Using the known calibration relationships between PHY throughput, PHY latency, PHY errors, and higher-layer link quality metrics, the change in PHY error rates can be translated into a change in the higher-layer link quality metric.

For example, if crosstalk type X is detected that increases the rate of CRC errors from 1 error per day to 1 per minute, and it is known (from the calibration relationship) that a change in CRC errors from 1 per day to 1 per minute decreases a video quality metric by 83%, then the "video quality reduction from crosstalk type X" may be reported as "83%". Other higher-layer link quality reduction indicators may be computed as being attributable to any known impairment including, but not limited to, crosstalk, narrow-band disturbers (e.g., RFI, AM, or HAM), DSL bridged taps, metallic faults, bad coaxial cable splitters, etc. Similarly, link quality reduction indicators may be computed for any higher-layer link quality metric, such as video quality, audio quality, responsiveness (e.g., low latency for game applications), etc.

Another such indicator, referred to as a best attainable quality indicator, can be used to quantify the best line quality attainable if the communications link were fully conditioned (noise removed, bridged taps removed, faults repaired, etc.) and optimally configured. Using the known calibration relationships between PHY throughput, PHY latency, PHY errors, and higher-layer link quality metrics, the best-attainable PHY conditions can be translated into the best attainable higher-layer link quality metrics.

In one embodiment, the PHY can compute and report tradeoffs between various PHY metrics so that the PHY metrics may be controlled by a higher-layer line management system. Example tradeoffs include, but are not limited to, tradeoffs between PHY line stability (e.g., robustness against errors in the presence of changing line conditions), PHY payload data rates, and PHY latency. As an example, the PHY can provide higher payload rates with more errors, or lower payload rates with fewer errors. The PHY can quantify and report the tradeoff between the two performance levels and thereby give a higher-layer system or application the ability to choose a particular configuration along the tradeoff continuum. Through use of predetermined calibration relationships, the tradeoffs at the PHY can be translated to tradeoffs at the higher layers. Alternatively, the PHY can be configured (via PHY controls) for a particular point on the PHY tradeoff continuum in order to achieve desired higher-layer criteria.

The above-described methods and systems and can be implemented in a software module, a software and/or hardware testing module, a telecommunications test device, a DSL modem, an ADSL modem, an xDSL modem, a VDSL modem, a linecard, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: xDSL, CDSL, ADSL2, ADSL2+, VDSL1, VDSL2, HDSL, DSL Lite, IDSL, RADSL, SDSL, UDSL, or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention.

As will be appreciated by one skilled in the art, aspects of the present invention may be embodied as a system, method, or computer program product. Accordingly, aspects of the present invention may take the form of an entirely hardware embodiment (e.g., standard logic circuits or VLSI design), an entirely software embodiment (including firmware, resident software, micro-code, etc.) or an embodiment combining software and hardware aspects. All such forms may be generally referred to herein as a "system". Furthermore, aspects of the present invention may take the form of a computer program product embodied in one or more computer readable storage medium(s) having computer readable program code embodied thereon.

A computer readable storage medium may be any tangible medium that can contain, or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium include, but are not limited to, the following: a portable computer diskette, a hard disk, a random access memory (RAM), a read-only memory (ROM), an erasable programmable read-only memory (EEPROM, EPROM, Flash memory), an optical fiber, a portable compact disc read-only memory (CD-ROM), an optical storage device, a magnetic storage device, or any suitable combination of the foregoing. Program code embodied on a computer readable storage medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java®, CGI script, Smalltalk, C++ or the like and conventional procedural programming languages, such as the "C" programming language or similar programming languages.

Aspects of the present invention are described herein with reference to flowchart illustrations and block diagrams of methods, apparatus (systems), and computer program products in accordance with embodiments of the invention. Each block of the flowchart illustrations and block diagrams, and combinations of blocks in the flowchart illustrations and block diagrams can be implemented by computer program instructions.

Computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions, acts, or operations specified in the flowchart and block diagram block. Computer program instructions may also be stored in a computer readable storage medium that can direct a computer, other programmable data processing apparatus, or other devices to function in a particular manner, such that the instructions stored in the computer readable medium produce an article of manufacture including instructions which implement the function, act, or operation specified in the flowchart and block diagram block.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions, acts, or operations specified in the flowchart or diagram block.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of program code, which comprises one or more executable instructions for implementing the specified logical function(s). The functions noted in the blocks may occur out of the order noted in the FIGS. For example, two blocks shown in succession may be executed substantially concurrently, or the blocks may sometimes be executed in the reverse order, depending upon the functionality involved. In addition, each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While one or more example embodiments described herein discuss various components of the system as being collocated, it should be appreciated that various components may be located separately (e.g., at distant portions of a distributed network, such as a telecommunications network and/or the Internet or within a dedicated communications network). Thus, it should be appreciated that various components of the system may be combined into one or more devices or collocated on a particular node of a distributed network, such as a telecommunications network.

While the invention has been shown and described with reference to specific example embodiments, it should be appreciated that individual aspects of the invention can be separately claimed and one or more of the features of the various embodiments can be combined. In addition, it should be understood by those skilled in the art that various changes in form and detail may be made therein without departing from the spirit and scope of the invention as defined by the following claims.

What is claimed is:

1. A method for controlling a performance of a communication link in a communication system, the method comprising:
    mapping performance of a communication link, as characterized by metrics reported by the first protocol layer in a network device, to quality of the communication link, as characterized by metrics reported by a second protocol layer in the network device, the second protocol layer being higher than the first protocol layer in a protocol stack running on the network device;
    adjusting a setting of one or more communication link controls at the first protocol layer to attain a given communication link performance at the first protocol layer that, according to the mapping between the communication link performance at the first protocol layer and the quality of the communication link at the second protocol layer, corresponds to a target quality of the communication link at the second protocol layer; and
    inserting a specific type of disruption in a physical layer associated with the first protocol layer and observing an effect of the specific type of disruption on quality of the communication link of the second protocol layer.

2. The method of claim 1, wherein adjusting the setting of one or more communication link controls at the first protocol layer occurs dynamically while the communication link is in operation.

3. The method of claim 1, wherein the adjusting a setting of one or more communication link controls at the first protocol layer occurs before the communication link begins operation.

4. The method of claim 1, further comprising adjusting a setting of one or more communication link controls of the second protocol layer to affect communication link quality at the second protocol layer.

5. The method of claim 1, further comprising computing a link quality reduction indicator that quantifies an effect of the specific type of disruption at the first protocol layer on the quality of the communication link as characterized by the metrics reported by the second protocol layer.

6. The method of claim 1, further comprising calculating a best attainable quality indicator that quantifies a best line quality capable for the communication link.

7. The method of claim 1, further comprising computing tradeoffs between two or more metrics associated with performance of the communication link at the first protocol layer; and using the mapping between the communication link performance at the first protocol layer and the quality of the communication link at the second protocol layer to translate the computed tradeoffs to tradeoffs between two or more metrics associated with the quality of the communication link at the second protocol layer.

8. The method of claim 1, further comprising calibrating a relationship between disruptions at the first protocol layer and quality of the communication link as characterized by metrics reported by the second protocol layer.

9. The method of claim 8, wherein the calibrating occurs before the communication link is in operation.

10. The method of claim 8, wherein the calibrating includes intentionally introducing disruptions to the performance of the communication link at the first protocol layer while monitoring effects of the disruptions on the quality of the communication link as characterized by metrics reported by the second protocol layer.

11. The method of claim 1, wherein the second protocol layer is an application layer.

12. A non-transitory computer readable persistent storage medium for controlling a performance of a communication link in a communication system, the storage medium comprising:
 a computer readable persistent storage medium having computer readable program code embodied therewith, the computer readable program code comprising:
 computer readable program code that, if executed, maps performance of a communication link, as characterized by metrics reported by a first protocol layer in a network device, to quality of the communication link, as characterized by metrics reported by a second protocol layer in the network device, the second protocol layer being higher than the first protocol layer in a protocol stack running on the network device;
 computer readable program code that, if executed, adjusts a setting of one or more communication link controls at the first protocol layer to attain a given communication link performance at the first protocol layer that, according to the mapping between the communication link performance at the first protocol layer and the quality of the communication link at the second protocol layer, corresponds to a target quality of the communication link at the second protocol layer; and
 computer program code that, if executed inserts a specific type of disruption in a physical layer associated with the first protocol layer and observing an effect of the specific type of disruption on quality of the communication link of the second protocol layer.

13. The storage medium of claim 12, wherein the computer readable program code that, if executed, adjusts the setting of one or more communication link controls at the first protocol layer includes computer readable program code that, if executed, adjusts the setting of one or more communication link controls at the first protocol layer dynamically while the communication link is in operation.

14. The storage medium of claim 12, wherein the computer readable program code that, if executed, adjusts the setting of one or more communication link controls at the first protocol layer includes computer readable program code that, if executed, adjusts the setting of one or more communication link controls at the first protocol layer before the communication link begins operation.

15. The storage medium of claim 12, further comprising computer readable program code that, if executed, adjusts the setting of one or more communication link controls of the second protocol layer to affect communication link quality at the second protocol layer.

16. The storage medium of claim 12, further comprising computer readable program code that, if executed, computes a link quality reduction indicator that quantifies an effect of the specific type of disruption at the first protocol layer on the quality of the communication link as characterized by the metrics reported by the second protocol layer.

17. The storage medium of claim 12, further comprising computer readable program code that, if executed, calculates a best attainable quality indicator that quantifies a best line quality capable for the communication link.

18. The storage medium of claim 12, further comprising computer readable program code that, if executed, computes tradeoffs between two or more metrics associated with performance of the communication link at the first protocol layer; and
 using the mapping between the communication link performance at the first protocol layer and the quality of the communication link at the second protocol layer to translate the computed tradeoffs to tradeoffs between two or more metrics associated with the quality of the communication link at the second protocol layer.

19. The storage medium of claim 12, further comprising computer readable program code that, if executed, calibrates a relationship between disruptions at the first protocol layer and quality of the communication link as characterized by metrics reported by the second protocol layer.

20. The storage medium of claim 19, wherein the computer readable program code that, if executed, calibrates a relationship between disruptions at the first protocol layer and quality of the communication link as characterized by metrics reported by the second protocol layer includes computer readable program code that, if executed, intentionally introduces disruptions to the performance of the communication link at the first protocol layer while monitoring effects of the disruptions on the quality of the communication link as characterized by metrics reported by the second protocol layer.

21. The storage medium of claim 12, wherein the second protocol layer is an application layer.

22. A communication system, comprising:
 memory storing computer readable program code; and
 a processor capable of running the computer readable program code stored in the memory, the computer readable program code, if executed:
  mapping performance of a communication link, as characterized by metrics reported by a first protocol layer in a network device, to quality of the communication link, as characterized by metrics reported by a second protocol layer in the network device, the second protocol layer being higher than the first protocol layer in a protocol stack running on the network device; and
  adjusting a setting of one or more communication link controls at the first protocol layer to attain a given communication link performance at the first protocol layer that, according to the mapping between the communication link performance at the first protocol layer and the quality of the communication link: at the second protocol layer, corresponds to a target quality of the communication link at the second protocol layer; and
  inserting a specific type of disruption in a physical layer associated with the first protocol layer and observing an effect of the specific type of disruption on quality of the communication link of the second protocol layer.

23. The system of claim 22, further comprising a dynamic line management system that adjusts the setting of one or more communication link: controls of the first protocol layer dynamically while the communication link is in operation.

24. The system of claim 22, wherein the computer readable program code includes computer readable program code that, if executed, adjusts the setting of one or more communication link: controls at the first protocol layer before the communication link begins operation.

25. The system of claim 22, wherein the computer readable program code further includes computer readable program code that, if executed, adjusts the setting of one or more communication link controls of the second protocol layer to affect communication link quality at the second protocol layer.

26. The system of claim 22, wherein the computer readable program code further includes computer readable program code that, if executed, computes a link: quality reduction indicator that quantifies an effect of the specific type of disruption at the first protocol layer on the quality of the communication link as characterized by the metrics reported by the second protocol layer.

27. The system of claim 22, wherein the computer readable program code further includes computer readable program code that, if executed, calculates a best attainable quality indicator that quantifies a best line quality capable for the communication link.

28. The system of claim 22, wherein the computer readable program code further includes computer readable program code that, if executed, computes tradeoffs between two or more metrics associated with performance of the communication link at the first protocol layer; and using the mapping between the communication link: performance at the first protocol layer and the quality of the communication link at the second protocol layer to translate the computed tradeoffs to tradeoffs between two or more metrics associated with the quality of the communication link: at the second protocol layer.

29. The system of claim 22, wherein the computer readable program code further includes computer readable program code that, if executed, calibrates a relationship between disruptions at the first protocol layer and quality of the communication link as characterized by metrics reported by the second protocol layer.

30. The system of claim 29, wherein the computer readable program code that, if executed, calibrates a relationship between disruptions at the first protocol layer and quality of the communication link as characterized by metrics reported by the second protocol layer further includes the computer readable program code that, if executed, intentionally introduces disruptions to the performance of the communication link at the first protocol layer while monitoring effects of the disruptions on the quality of the communication link as characterized by metrics reported by the second protocol layer.

31. The system of claim 22, wherein the second protocol layer is an application layer.

* * * * *